(12) United States Patent
Murakami

(10) Patent No.: US 11,398,873 B2
(45) Date of Patent: Jul. 26, 2022

(54) SIGNAL SUPPLY DEVICE

(71) Applicant: DENSO CORPORATION, Kariya (JP)

(72) Inventor: Bunsei Murakami, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/330,045

(22) Filed: May 25, 2021

(65) Prior Publication Data

US 2021/0281330 A1 Sep. 9, 2021

Related U.S. Application Data

(63) Continuation of application No. PCT/JP2019/045342, filed on Nov. 20, 2019.

(30) Foreign Application Priority Data

Nov. 29, 2018 (JP) .............................. JP2018-223633

(51) Int. Cl.
*H04B 17/10* (2015.01)
*H04B 1/04* (2006.01)
*H04B 1/38* (2015.01)
*H04B 17/16* (2015.01)
*H04B 17/17* (2015.01)
(Continued)

(52) U.S. Cl.
CPC ............. *H04B 17/102* (2015.01); *H04B 1/04* (2013.01); *H04B 1/3822* (2013.01)

(58) Field of Classification Search
None
See application file for complete search history.

(56) References Cited

U.S. PATENT DOCUMENTS 8,183,917 B2 * 5/2012 Drogi ..................... H03F 3/245
330/136
9,654,154 B2 * 5/2017 Subrahmaniyan
Radhakrishnan .... H03G 1/0005
(Continued)

FOREIGN PATENT DOCUMENTS

EP 3185022 A1 * 6/2017 ............. G01R 23/02
JP 2008224522 A * 9/2008
(Continued)

OTHER PUBLICATIONS

U.S. Appl. No. 17/329,902, filed May 25, 2021, Bunsei Murakami.

*Primary Examiner* — Pablo N Tran
(74) *Attorney, Agent, or Firm* — Harness, Dickey & Pierce, P.L.C.

(57) ABSTRACT

The signal supply device includes a frequency adjuster, a modulator, an amplifier, a current measurer, a frequency setter, and a controller. While the controller executes a test signal supply process for changing a frequency of a carrier wave within a frequency range predetermined as a range of a resonance frequency of an antenna, modulating the carrier wave with a test signal as an input signal, amplifying the carrier wave that is modulated and supplying the carrier wave that is amplified as an output target signal to the antenna, the controller measures an antenna current corresponding to the frequency each time the frequency of the carrier wave is changed. The frequency setter sets, as a usage frequency used as the frequency of the carrier wave, the frequency corresponding to the antenna current on a larger side among the antenna currents measured during execution of the test signal supply process.

6 Claims, 6 Drawing Sheets

(51) Int. Cl.
*G01R 29/10* (2006.01)
*H04B 1/3822* (2015.01)

(56) References Cited

U.S. PATENT DOCUMENTS

| | | | | |
|---|---|---|---|---|
| 9,800,274 | B2 * | 10/2017 | Yan | H04W 52/52 |
| 2010/0283477 | A1 * | 11/2010 | Vanaud | G01R 31/54 |
| | | | | 324/538 |
| 2016/0164550 | A1 * | 6/2016 | Pilgram | H03F 3/19 |
| | | | | 375/295 |
| 2017/0279412 | A1 * | 9/2017 | Afsahi | H03F 3/245 |

FOREIGN PATENT DOCUMENTS

| | | | | |
|---|---|---|---|---|
| JP | 2012067499 A | * | 4/2012 | G07C 9/00309 |
| JP | 2017183835 A | * | 10/2017 | |
| WO | WO-2018037698 A1 | * | 3/2018 | H02J 50/12 |

* cited by examiner

SIGNAL SUPPLY DEVICE

CROSS REFERENCE TO RELATED APPLICATIONS

The present application is a continuation application of International Patent Application No. PCT/JP2019/045342 filed on Nov. 20, 2019, which designated the U.S. and claims the benefit of priority from Japanese Patent Application No. 2018-223633 filed on Nov. 29, 2018. The entire disclosures of all of the above applications are incorporated herein by reference.

TECHNICAL FIELD

The present disclosure relates to a signal supply device.

BACKGROUND

A system that automatically opens and closes doors of a vehicle, locks and unlocks the doors of the vehicle, starts an engine, and the like by wireless communication between an in-vehicle device mounted on a vehicle and a portable terminal carried by a user of the vehicle has been used. Such a system is referred to, for example, a smart key system, a smart entry system, and a remote keyless entry system.

SUMMARY

The present disclosure provides a signal supply device that executes a test signal supply process for changing a frequency of a carrier wave within a frequency range predetermined as a range of a resonance frequency of an antenna, modulating the carrier wave with a test signal as an input signal, amplifying the carrier wave that is modulated and supplying the carrier wave that is amplified as an output target signal to the antenna. While executing the test signal supply process, the signal supply device measures an antenna current corresponding to the frequency each time the frequency of the carrier wave is changed. The signal supply device sets, as a usage frequency used as the frequency of the carrier wave, the frequency corresponding to the antenna current on a larger side among the antenna currents measured during execution of the test signal supply process.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
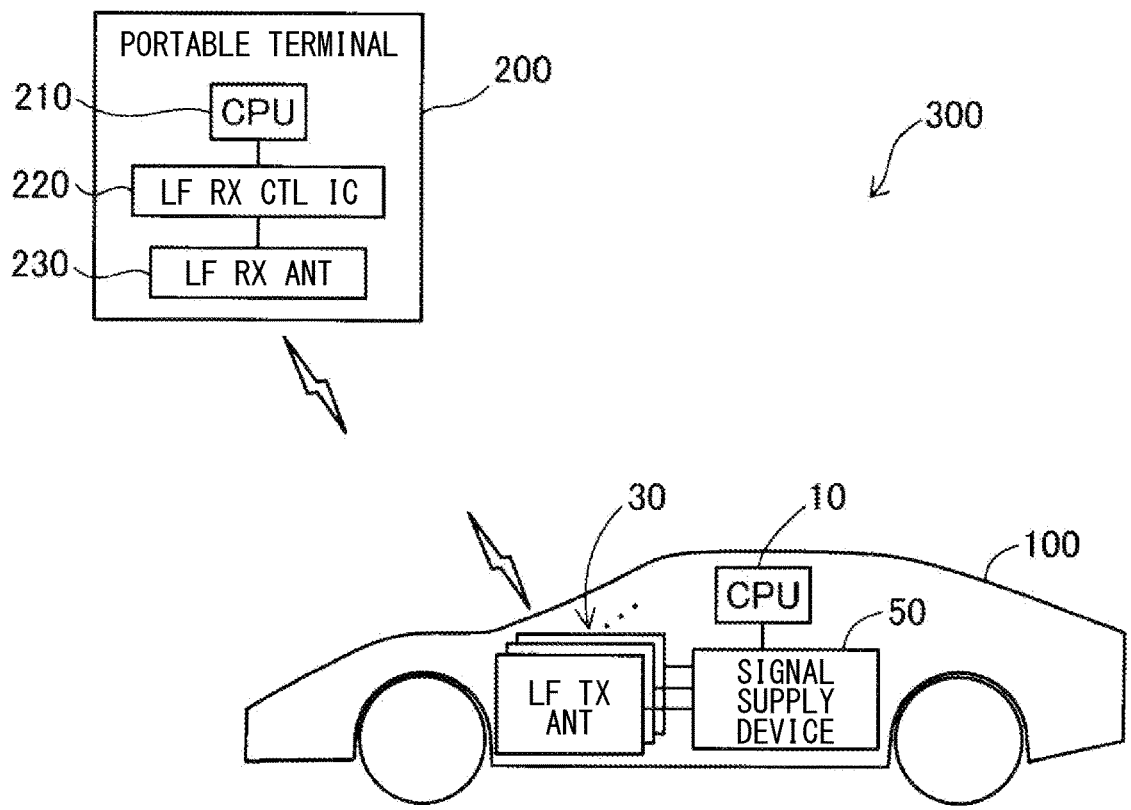
FIG. 1 is an explanatory diagram showing a schematic configuration of a vehicle system including a signal supply device as an embodiment of the present disclosure.

For wireless communication between an in-vehicle device and a portable terminal, a signal in an LF (Low Frequency) frequency band, for example, a frequency band of 30 kHz to 300 kHz (hereinafter, referred to as an "LF signal") may be used. It is desirable that a resonance frequency of an antenna on a transmission side of the LF signal and a resonance frequency of an antenna on a reception side match, and if the resonance frequency of at least one of the antennas fluctuates, a communication performance of the LF signal may deteriorate. In order to suppress deterioration of communication performance of the LF signal, a plurality of resonance circuits using a plurality of capacitors having different capacities may be provided in advance in the portable terminal, and a resonant circuit to be used may be selected according to the magnitude of an electric field strength (RSSI) when an LF signal for a test transmitted from the in-vehicle device is received by the portable terminal.

In addition to the in-vehicle device, a vehicle that transmits the LF signal may be provided with an antenna and a signal supply device that supplies the LF signal to be output to the antenna. The signal supply device is also called an LF transmission circuit, modulates a carrier wave in the LF frequency band with a signal input from the in-vehicle device, amplifies the modulated signal, and supplies the modulated signal to the antenna as the LF signal. Generally, a drive frequency of the signal supply device, that is, the frequency of the carrier wave used for modulation in the signal supply device is set to match the resonance frequency of the antenna for LF signal transmission in order to improve communication performance. However, if circuit constants of the antenna, for example, a capacitance of a capacitor and an inductance of a coil vary within the range of design tolerances, the drive frequency of the signal supply device and the resonance frequency of the antenna may deviate from each other. When such a deviation occurs, the strength of the transmitted LF signal cannot be controlled to an appropriate value, and an issue such as a decrease in the detection accuracy of the portable terminal using the LF signal may occur.

In the system described above, the resonance frequency of the antenna on the reception side of the LF signal is merely adjusted to match the resonance frequency of the antenna on the transmission side, and it is not possible to suppress the occurrence of the deviation between the drive frequency of the signal supply device and the resonance frequency of the antenna on the transmission side. Such an issue is common not only in LF signals but also in antennas and signal supply devices for outputting signals of any other frequency band. For these reasons, a technique capable of suppressing the occurrence of the above frequency deviation is desired.

According to one aspect of the present disclosure, a signal supply device for supplying an output target signal to an antenna is provided. The signal supply device includes a frequency adjuster configured to adjust a frequency of a carrier wave, a modulator configured to modulate the carrier wave with an input signal, an amplifier configured to amplify the carrier wave that is modulated to generate the output target signal and supply the output target signal to the antenna, a current measurer configured to measure an antenna current that flows through the antenna, a frequency setter configured to set a usage frequency used as the frequency of the carrier wave, and a controller. While the controller executes a test signal supply process in which the controller controls the frequency adjuster to change the frequency of the carrier wave within a frequency range predetermined as a range of a resonance frequency of the antenna, controls the modulator to modulate the carrier wave with a test signal as the input signal, controls the amplifier to amplify the carrier wave that is modulated and supply the carrier wave that is amplified as the output target signal to the antenna, the controller controls the current measurer to measure the antenna current corresponding to the frequency each time the frequency of the carrier wave is changed. The frequency setter sets, as the usage frequency, the frequency corresponding to the antenna current on a larger side among the antenna currents measured during execution of the test signal supply process.

According to the signal supply device of this aspect, the frequency setter sets the frequency corresponding to the antenna current on the larger side among the antenna currents measured during execution of the test signal supply process as the usage frequency. Therefore, it is possible to suppress the occurrence of a deviation between the resonance frequency and the usage frequency, that is, a drive frequency of the signal supply device. When the deviation between the resonance frequency of the antenna and the frequency of the carrier wave is small, the measured antenna current becomes large. Therefore, the frequency of the carrier wave when the antenna current on the larger side among the antenna currents measured during the test signal supply process is the frequency on a side where the deviation from the resonance frequency of the antenna is smaller. Therefore, as described above, according to the signal supply device of this aspect, it is possible to suppress the occurrence of the deviation between the resonance frequency of the antenna and the usage frequency (the drive frequency of the signal supply device).

The present disclosure can also be realized in various forms other than the signal supply device. For example, the present disclosure can also be realized in the form of a vehicle control device, a vehicle system, a smart key system, a smart entry system, a smart keyless entry system, a usage frequency setting method, a computer program for realizing such a method, a storage medium for storing the computer program, or the like.

A. First Embodiment

A1. Device Configuration:

A vehicle system 300 shown in FIG. 1 is a system that realizes remote keyless entry by wirelessly communicating with each other between a vehicle 100 and a portable terminal 200. The remote keyless entry means that when a user of the vehicle 100 operates a switch (not shown) of the portable terminal 200, a door of the vehicle 100 is opened, closed, unlocked, locked, etc. according to the operation. A smart entry may be realized instead of the remote keyless entry or in addition to the remote keyless entry. The smart entry means that the door of the vehicle 100 is unlocked when the user of the vehicle 100 carrying the portable terminal 200 enters a wireless communication area near the vehicle 100, and that the vehicle 100 is started by the user sitting in the driver's seat while carrying the portable terminal 200 and operating a predetermined switch.

The vehicle 100 and the portable terminal 200 transmit and receive an LF band signal (hereinafter referred to as "LF signal") and a UHF (Ultra High Frequency) band signal (hereinafter referred to as "UHF signal"). The LF band means, for example, a frequency band of 30 kHz to 300 kHz. The UHF band means, for example, a frequency band of 300 MHz to 3 GHz.

As shown in FIG. 1, the vehicle system 300 includes a CPU 10 mounted on the vehicle 100, a signal supply device 50, LF transmission antennas (LF TX ANTs) 30, and the portable terminal 200. In the present embodiment, the CPU 10 constitutes a part of an ECU (Electronic controller) as a so-called in-vehicle device. By executing a control program stored in a memory included in the ECU, the CPU 10 executes a function as the in-vehicle device, for example, control of exchange of various signals with the portable terminal 200, authentication process of the portable terminal 200, and the like.

Figure 2:
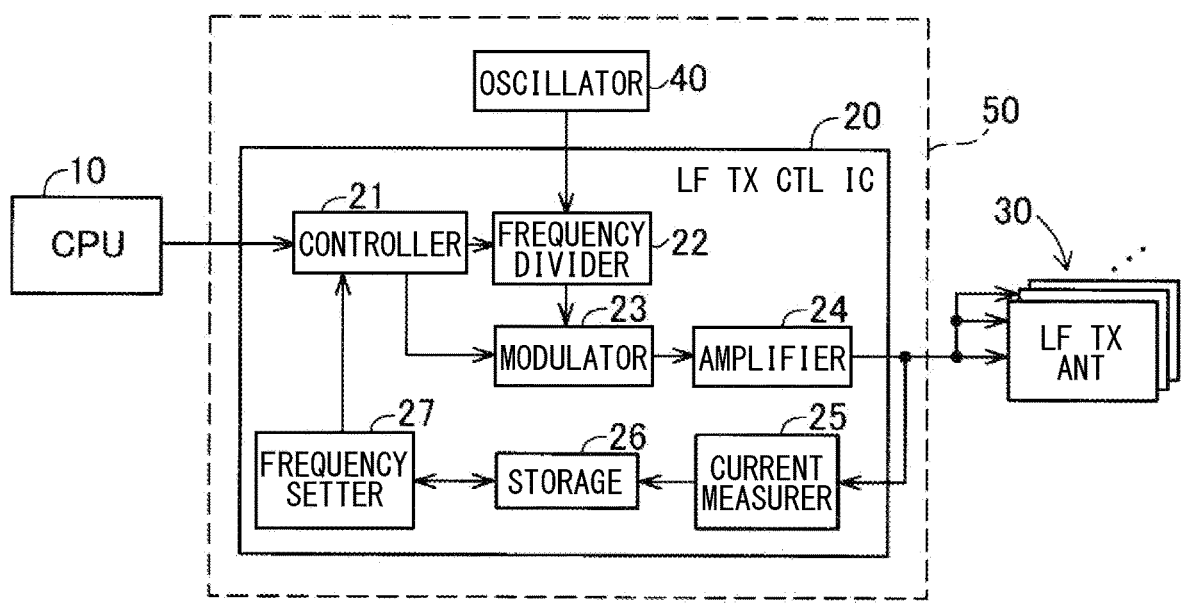
FIG. 2 is a block diagram showing a configuration of a signal supply device according to a first embodiment.

As shown in FIGS. 1 and 2, the signal supply device 50 is electrically connected to the CPU 10 and each of the LF transmission antennas 30. The signal supply device 50 supplies the LF signal to each of the LF transmission antennas 30 under the control of the CPU 10. As shown in FIG. 2, the signal supply device 50 includes an oscillator 40 and an LF transmission control IC (integrated circuit) 20. The oscillator 40 outputs a signal of a predetermined frequency, for example, a sine wave signal of 16 MHz (megahertz). A signal of any frequency may be output, not limited to 16 MHz. The oscillator 40 may be composed of, for example, a crystal oscillator.

The LF transmission control IC 20 includes a controller 21, a frequency divider 22, a modulator 23, an amplifier 24, a current measurer 25, a storage 26, and a frequency setter 27.

The controller 21 controls the overall operation of the LF transmission control IC 20. For example, the controller 21 controls the frequency divider 22 so that a frequency of a carrier wave becomes a frequency set by the frequency setter 27. Further, for example, when the controller 21 receives an input signal to be transmitted as an LF signal from the CPU 10, the controller 21 passes the signal to the modulator 23 and controls the modulator 23 to modulate the carrier wave.

Under the control of the controller 21, the frequency divider 22 divides a signal having a predetermined frequency output from the oscillator 40 to generate and output the carrier wave having a usage frequency. The "usage frequency" means the frequency used in the normal state as the frequency of the carrier wave for transmitting the LF signal. The "normal state" means a state in which power is supplied to the signal supply device 50 after the vehicle 100 is shipped.

The modulator 23 modulates the carrier wave output from the frequency divider 22 by the input signal received from the controller 21. The amplifier 24 amplifies the modulated carrier wave to generate an LF signal, and supplies the LF signal to the LF transmission antenna 30. The current measurer 25 measures the current flowing through the LF transmission antenna 30 (hereinafter, referred to as "antenna current"), and stores the current value of the measurement result in the storage 26. The storage 26 has a storage capacity capable of storing at least all the current values measured by the current measurer 25 during execution of a usage frequency adjustment process described later.

The frequency setter 27 sets the usage frequency. A predetermined value is set in advance as an initial value f(int) of the usage frequency. However, before the vehicle 100 is shipped, the usage frequency adjustment process described later is executed to adjust the usage frequency. The details of the usage frequency adjustment process will be described later. The controller 21 and the frequency divider 22 described above correspond to a subordinate concept of a frequency adjuster in the present disclosure.

Each of the LF transmission antenna 30 is electrically connected to the signal supply device 50, and outputs the LF signal supplied from the signal supply device 50 as a radio wave. In the present embodiment, each of the LF transmission antennas 30 includes an RLC circuit. A resistance value of a resistor, an inductance of a coil, and a capacitance of a capacitor are adjusted in advance so that a resonance frequency of the LF transmission antenna 30 becomes a predetermined resonance frequency. However, even in each of the adjusted LF transmission antennas 30, there is a variation in the resonance frequency within a range of a design tolerance. Each of the LF transmission antennas 30 is installed at a different location in the vehicle 100. For example, each of the LF transmission antennas 30 is arranged in a driver's seat door, a passenger seat door, and a rear seat door, between a driver's seat and a passenger seat, between a rear seat and a trunk room, or the like The output power of the LF signal output from each of the LF transmission antennas 30 is adjusted in the range of several tens of cm (centimeters) to several m (meters) centered on each of the LF transmission antennas 30 so as to be received by the portable terminal 200 with a predetermined reception signal strength. In this way, by limiting the receivable area of the LF signal to a relatively narrow range, it is possible to specify the rough position of the portable terminal 200.

The vehicle 100 is equipped with various devices related to the reception of UHF signals, but in the present embodiment, illustration and detailed description thereof will be omitted. The various devices related to the reception of the UHF signal correspond to, for example, an antenna for receiving the UHF signal, and an IC that amplifies or encodes the signal received by the antenna and extracts the signal.

As shown in FIG. 1, the portable terminal 200 includes a CPU 210, an LF reception control IC (LF RX CTL IC) 220, and an LF reception antenna (LF RX ANT) 230. In addition to controlling the overall operation of the portable terminal 200, the CPU 210 exchanges various signals with the ECU as the in-vehicle device. For example, when receiving the LF signal, the CPU 210 controls the LF reception control IC 220 and transmits a response signal including an identifier preset in the portable terminal 200 as a UHF signal. The LF reception control IC 220 is electrically connected to the CPU 210 and executes various processes related to the reception of the LF signal under the control of the CPU 210. Specifically, the LF reception control IC 220 amplifies and encodes the signal received from the LF reception antenna 230. The LF reception antenna 230 is electrically connected to the LF reception control IC 220, receives the LF signal, and passes the received signal to the LF reception control IC 220. The portable terminal 200 is equipped with various devices related to transmission of UHF signals, but in the present embodiment, illustration and detailed description thereof will be omitted. The various devices related to the transmission of the UHF signals correspond to, for example, an antenna for transmitting a UHF signal, an IC for generating a signal to be supplied to the antenna, and the like.

As described above, the resonance frequency of each of the LF transmission antennas 30 has a variation within the range of the design tolerance. Therefore, a deviation may occur between the drive frequency of the signal supply device 50, that is, the usage frequency, and the resonance frequency of the LF transmission antenna 30. If the usage frequency and the resonance frequency of the LF transmission antenna 30 deviate from each other in this way, the strength of the LF signal varies, and the accuracy of specifying the position of the portable terminal 200 may decrease. Therefore, in the present embodiment, the usage frequency adjustment process described later is executed before shipment, and the occurrence of deviation between the usage frequency and the resonance frequency of the LF transmission antenna 30 is restricted.

A2. Usage Frequency Adjustment Process:

Before the vehicle 100 is shipped, a worker instructs the CPU 10 and the signal supply device 50 to execute the frequency adjustment process, so that the frequency adjustment process is started. In the present embodiment, such an instruction is realized by displaying a maintenance menu screen on a display provided on an instrument panel of the vehicle 100, and selecting "usage frequency adjustment process" on the menu screen. The usage frequency adjustment process is performed for each of the LF transmission antennas 30. For example, after the vehicle 100 is completed, the frequency adjustment process may be executed as one of the procedures in the test for the completed vehicle.

Figure 3:
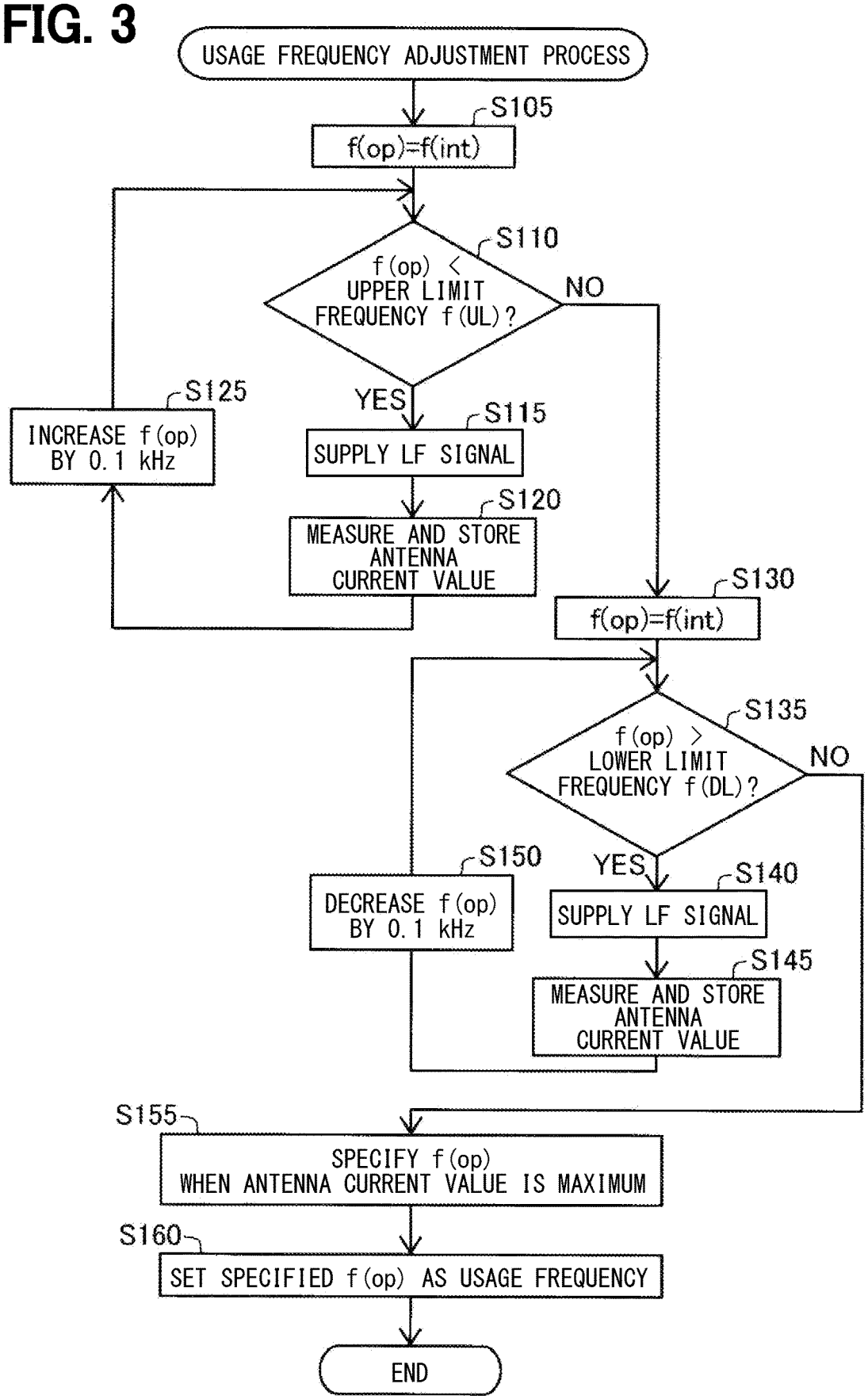
FIG. 3 is a flowchart showing a procedure of a usage frequency adjustment process in the first embodiment.

As shown in FIG. 3, the controller 21 sets the initial value f(int) as the frequency f(op) of the carrier wave (S105). In the present embodiment, the initial value f(int) is set to the median value of the design tolerance of the resonance frequency of the LF transmission antenna 30. Specifically, the design tolerance of the resonance frequency of the LF transmission antenna 30 is 120 kHz to 130 kHz, and the initial value f(int) is 125 kHz. The design tolerance is not limited to 120 kHz to 130 kHz. Further, the initial value f(int) is not limited to the median value, and may be set to any value within the range of the design tolerance. Therefore, for example, the design tolerance may be 110 kHz to 140 kHz, and the initial value f(int) may be 134 kHz.

The controller 21 determines whether or not the frequency f(op) of the carrier wave is lower than an upper limit frequency f(UL) within the design tolerance of the LF transmission antenna 30 (S110). When it is determined that the frequency f(op) is lower than the upper limit frequency f(UL) (130 kHz) (S110: YES), the controller 21 supplies a test signal as the LF signal to the LF transmission antenna 30 (S115). For example, a signal having a predetermined length in which "0" and "1" appear alternately may be used as the test signal. The controller 21 controls the frequency divider 22 to generate the carrier wave having the frequency f(op), controls the modulator 23 to modulate the carrier wave with the test signal, and controls the amplifier 24 to amplify the carrier wave after modulation and supplies the test signal as the LF signal to the LF transmission antenna 30.

The current measurer 25 measures the antenna current when the test signal (LF signal) is supplied to the LF transmission antenna 30, and stores the antenna current in the storage 26 (S120). At this time, the measured antenna current value and the frequency f(op) of the carrier wave at this time are stored in association with each other.

The controller 21 increases the frequency f(op) of the carrier wave by 0.1 kHz (S125). After the execution of S125, the above-described S110 is executed. In this way, the supply of the test signal (LF signal) (S115), measurement of the antenna current (S120), and increase of the frequency f(op) by 0.1 kHz are repeatedly executed until the frequency f(op) of the carrier wave reaches the upper limit frequency f(UL). Therefore, every time the frequency f(op) of the carrier wave is increased by 0.1 kHz, the carrier wave of such frequency f(op) is modulated with the test signal, and the antenna current when the obtained LF signal is amplified and supplied to the LF transmission antenna 30 is detected. The amount of frequency increase is not limited to 0.1 kHz and may be any value.

In S110 described above, when it is determined that the frequency f(op) is not lower than the upper limit frequency f(UL), that is, is equal to or higher than the upper limit frequency f(UL) (S110: NO), the controller 21 sets the initial value f(int) as the frequency f(op) of the carrier wave (S130). This S130 is the same as S105 described above.

The controller 21 determines whether or not the frequency f(op) of the carrier wave is higher than a lower limit frequency f(DL) within the design tolerance of the LF transmission antenna 30 (S135). When it is determined that the frequency f(op) is higher than the lower limit frequency f(DL) (120 kHz) (S135: YES), the controller 21 supplies the test signal as the LF signal to the LF transmission antenna 30 (S140). This S140 is the same as S115 described above. The current measurer 25 measures the antenna current when the test signal (LF signal) is supplied to the LF transmission antenna 30, and stores the antenna current in the storage 26 (S145). This S145 is the same as S120 described above.

The controller 21 decreases the frequency f(op) of the carrier wave by 0.1 kHz (S150). After the execution of S150, the above-described S135 is executed. In this way, the supply of the test signal (LF signal) (S140), measurement of the antenna current (S145), and decrease of the frequency f(op) by 0.1 kHz are repeatedly executed until the frequency f(op) of the carrier wave reaches the lower limit frequency f(DL). Therefore, every time the frequency f(op) of the carrier wave is decreased by 0.1 kHz, the carrier wave of such frequency f(op) is modulated with the test signal, and the antenna current when the obtained LF signal is amplified and supplied to the LF transmission antenna 30 is detected. In the present embodiment, the above-described S105 to S115, S125 to S140, and S150 are referred to as test signal supply process. Therefore, S105 to S150 described above can be said to be a process of measuring the antenna current corresponding to each frequency f(op) of the carrier wave and storing the antenna current in the storage 26 while executing the test signal supply process.

In S135 described above, when it is determined that the frequency f(op) is not higher than the lower limit frequency f(DL) (120 kHz), that is, is equal to or lower than the lower limit frequency f(DL) (S135: NO), the frequency setter 27 specifies the frequency f(op) when the antenna current value stored in the storage 26 is maximum (S155). The frequency setter 27 sets the frequency specified in S155 as the usage frequency (S160), and the usage frequency adjustment process ends. In S160, the frequency setter 27 specifically sets the usage frequency by storing the specified usage frequency in an area for storing the usage frequency in the storage 26.

When the deviation between the resonance frequency of the LF transmission antenna 30 and the frequency f(op) of the carrier wave is small, the antenna current has a large value. Therefore, in a case where the frequency f(op) is changed within the range of the design tolerance, the frequency f(op) when the antenna current is the maximum is the frequency having the smallest deviation from the resonance frequency of the LF transmission antenna 30. Therefore, according to the above-described usage frequency adjustment process, the frequency having the smallest deviation from the resonance frequency of the LF transmission antenna 30 can be set as the usage frequency.

According to the signal supply device 50 of the first embodiment described above, the frequency setter 27 sets the frequency corresponding to the maximum antenna current among the antenna currents measured during the execution of the test signal supply process as the usage frequency. Therefore, it is possible to suppress the occurrence of the deviation between the resonance frequency of the LF transmission antenna 30 and the usage frequency, that is, the drive frequency of the signal supply device 50. When the deviation between the resonance frequency of the LF transmission antenna 30 and the frequency f(op) of the carrier wave is small, the measured antenna current becomes large. Therefore, among the antenna currents measured during the test signal supply process, the carrier frequency f(op) when the maximum antenna current is measured is the frequency with the smallest deviation from the resonance frequency of the LF transmission antenna 30. Therefore, as described above, according to the signal supply device 50 of the present embodiment, it is possible to suppress the occurrence of the deviation between the resonance frequency of the LF transmission antenna 30 and the usage frequency (drive frequency of the signal supply device 50).

Further, in the test signal supply process, the controller 21 increases the frequency f(op) within the frequency range of the design tolerance in order from the initial value f(int) predetermined as the usage frequency, and when the frequency f(op) reaches the upper limit frequency f(UL), the controller 21 decreases the frequency f(op) in the frequency range of the design tolerance from the initial value f(int) to the lower limit frequency f(DL). Therefore, the frequency of the carrier wave can be changed at intervals of the predetermined frequency (0.1 kHz) without omission over the entire frequency range of the design tolerance.

Further, the signal supply device 50 includes the storage 26 for storing the value of the antenna current measured for each frequency f(op) of the carrier wave, and when the frequency setter 27 sets the usage frequency with reference to the value of the antenna current stored in the storage 26, the frequency setter 27 can easily specify the maximum antenna current among the antenna currents measured during the test signal supply process.

Further, since the signal supply device 50 is composed of the LF transmission control IC 20 and the oscillator 40, increase in the processing load of the CPU 10 can be suppressed compared with a configuration in which the CPU 10 executes at least a part of the usage frequency adjustment process.

B. Second Embodiment

Figure 4:
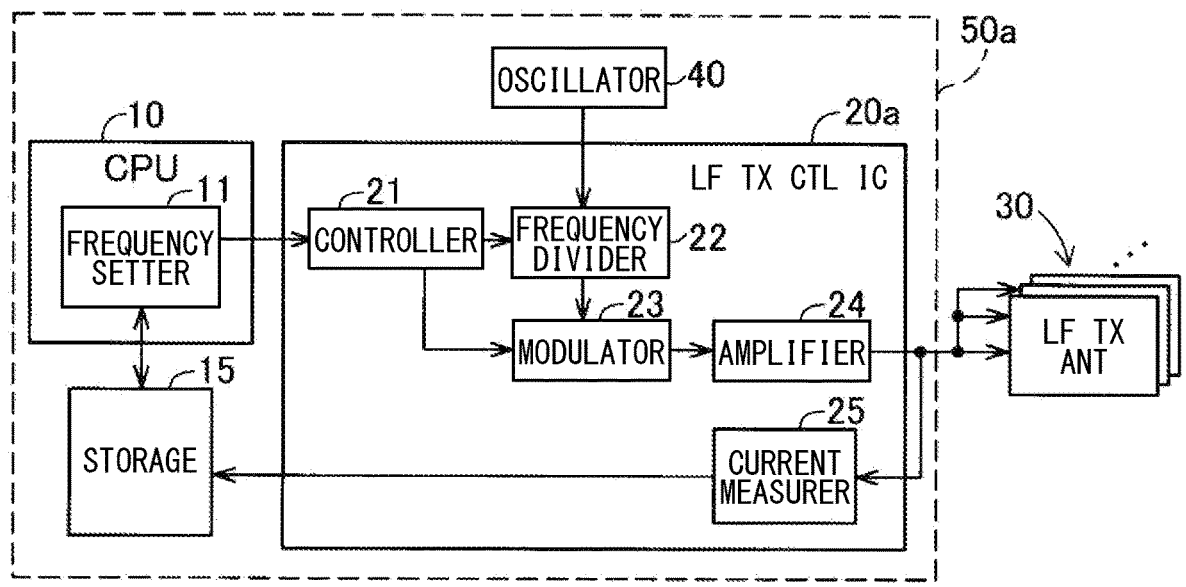
FIG. 4 is a block diagram showing a configuration of a signal supply device according to a second embodiment.

A signal supply device 50*a* of a second embodiment shown in FIG. 4 is different from the signal supply device of the first embodiment in that the signal supply device 50*a* includes an LF transmission control IC 20*a* instead of the LF transmission control IC 20, and includes the CPU 10 and a storage 15. Since the other configurations of the signal supply device 50*a* of the second embodiment are the same as those of the signal supply device 50 of the first embodiment, the same components are designated by the same reference numerals, and detailed description thereof will be omitted.

The LF transmission control IC 20*a* of the second embodiment is different from the LF transmission control IC 20 of the first embodiment in that the storage 26 and the frequency setter 27 are omitted, and the other configurations are same as those of the LF transmission control IC 20.

The CPU 10 of the second embodiment is different from the CPU 10 of the first embodiment in that the CPU 10 of the second embodiment functions as a frequency setter 11. The frequency setter 11 sets the usage frequency in a manner similar to the frequency setter 27 of the first embodiment.

The storage 15 is composed of a rewritable non-volatile memory, for example, an EEPROM (Electrically Erasable Programmable Read-Only Memory). The storage 15 stores the antenna current value measured in the test signal supply process in a manner similar to the storage 26 of the first embodiment. The storage 15 may form a part of the in-vehicle device like the CPU 210.

According to the signal supply device 50 of the second embodiment described above, effects similar to those of the signal supply device 50 of the first embodiment can be obtained.

C. Third Embodiment

Since the device configuration of the signal supply device 50 of the third embodiment is the same as that of the signal supply device 50 of the first embodiment, the same components are designated by the same reference numerals, and detailed description thereof will be omitted. In the frequency adjustment process of the first embodiment, when the frequency f(op) is changed by the predetermined frequency (0.1 kHz) within the frequency range of the design tolerance, the frequency f(op) is gradually increased from the initial value f(int), and when the frequency f(op) reaches the upper limit frequency f(UL) of the frequency range, the frequency f(op) is returned to the initial value f(int), and is decreased from the initial value f(int) to the lower limit frequency f(DL). On the other hand, in a usage frequency adjustment process of the third embodiment, the frequency f(op) is sequentially increased from the lower limit frequency f(DL) to the upper limit frequency f(UL). Hereinafter, a specific description will be given with reference to FIG. 5.

Figure 5:
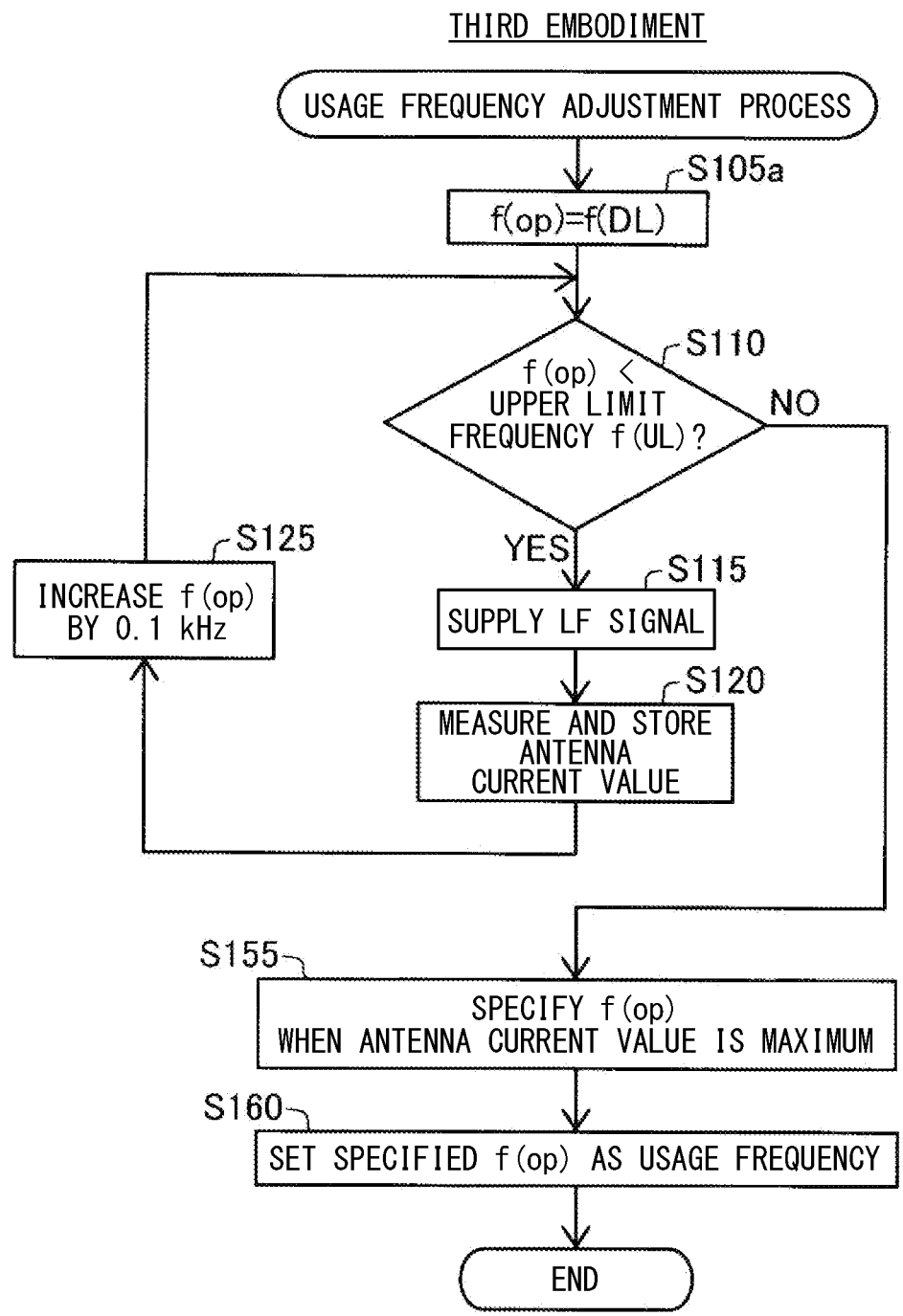
FIG. 5 is a flowchart showing a procedure of a usage frequency adjustment process in a third embodiment.

The frequency adjustment process of the third embodiment shown in FIG. 5 is different from the frequency adjustment process of the first embodiment in that S105a is provided instead of S105 and S130 to S150 are omitted. Since the other procedures of the usage frequency adjustment process of the third embodiment are the same as those of the usage frequency adjustment process of the first embodiment, the same procedures are designated by the same reference numerals and detailed description thereof will be omitted.

As shown in FIG. 5, the controller 21 sets the lower limit frequency f(DL) as the frequency f(op) of the carrier wave (S105a). After that, the above-described S110 to S125 are executed. In S110, when it is determined that the frequency f(op) is not lower than the upper limit frequency f(UL), that is, is equal to or higher than the upper limit frequency f(UL) (S110: NO), the above-described procedures in S155 and S160 are executed. That is, the frequency f(op) is increased by 0.1 kHz from the lower limit frequency f(DL) to the upper limit frequency f(UL), and when the frequency f(op) reaches the upper limit frequency f(UL), the frequency f(op) at the maximum value among the antenna currents stored by that time is specified, and the specified frequency f(op) is set as the usage frequency.

According to the signal supply device 50 of the third embodiment described above, effects similar to those of the signal supply device 50 of the first embodiment can be obtained.

D. Fourth Embodiment

Since the device configuration of the signal supply device 50 of the fourth embodiment is the same as that of the signal supply device 50 of the first embodiment, the same components are designated by the same reference numerals, and detailed description thereof will be omitted. In the frequency adjustment process of the first embodiment, when the frequency f(op) is changed by the predetermined frequency (0.1 kHz) within the frequency range of the design tolerance, the frequency f(op) is gradually increased from the initial value f(int), and when the frequency f(op) reaches the upper limit frequency f(UL) of the frequency range, the frequency f(op) is returned to the initial value f(int), and is decreased from the initial value f(int) to the lower limit frequency f(DL). On the other hand, in a usage frequency adjustment process of the fourth embodiment, the frequency f(op) is sequentially decreased from the upper limit frequency f(UL) to the lower limit frequency f(DL). Hereinafter, a specific description will be given with reference to FIG. 6.

Figure 6:
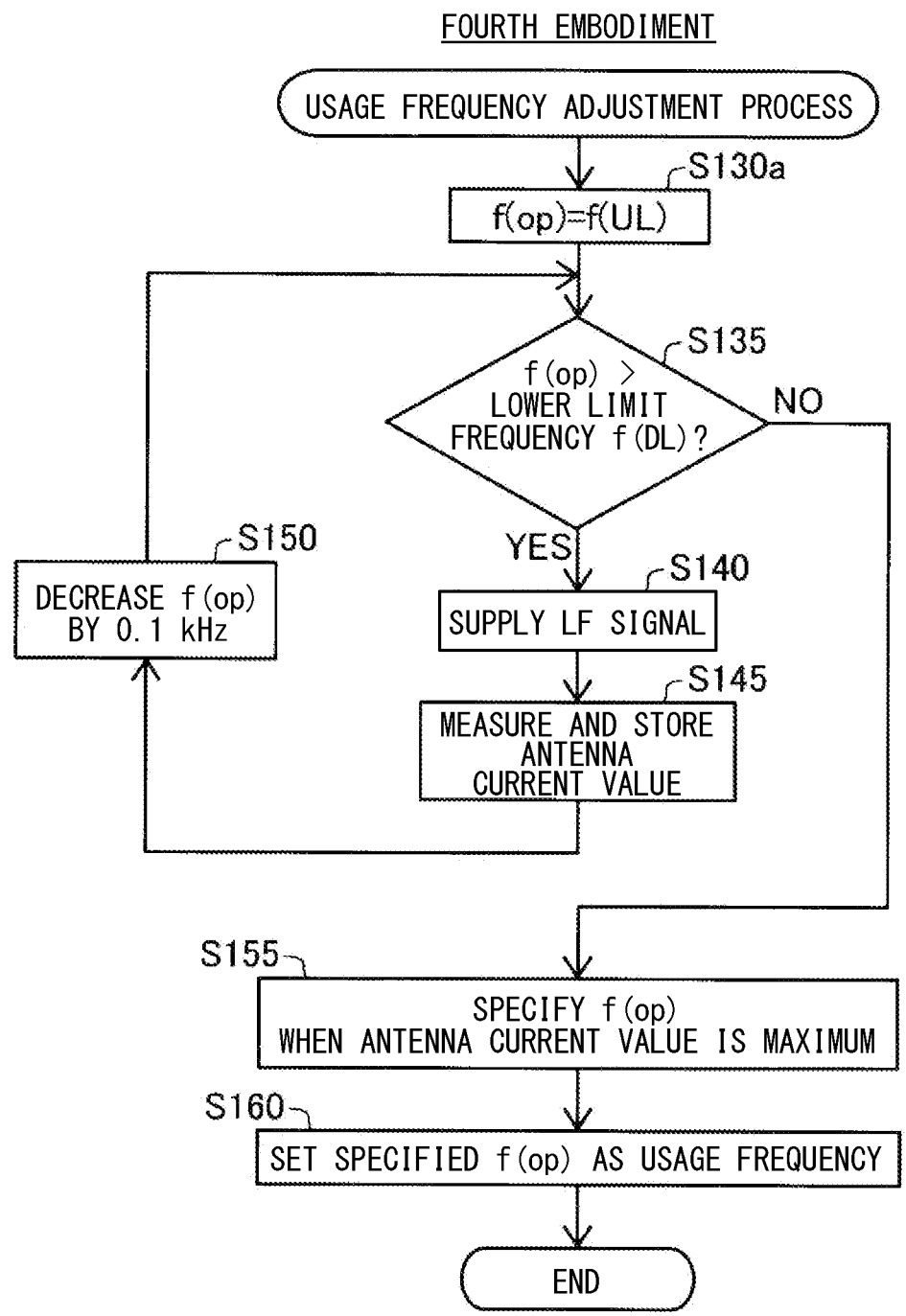
FIG. 6 is a flowchart showing a procedure of a usage frequency adjustment process in a fourth embodiment.

The frequency adjustment process of the fourth embodiment shown in FIG. 6 is different from the frequency adjustment process of the first embodiment in that S105 to S125 are omitted and S130a is provided instead of S130. Since the other procedures of the usage frequency adjustment process of the third embodiment are the same as those of the usage frequency adjustment process of the first embodiment, the same procedures are designated by the same reference numerals and detailed description thereof will be omitted.

As shown in FIG. 6, the controller 21 sets the upper limit frequency f(UL) as the frequency f(op) of the carrier wave (S130a). After that, S135 to S160 are executed. That is, the frequency f(op) is decreased by 0.1 kHz from the upper limit frequency f(UL) to the lower limit frequency f(DL), and when the frequency f(op) reaches the lower limit frequency f(DL), the frequency f(op) at the maximum value among the antenna currents stored by that time is specified, and the specified frequency f(op) is set as the usage frequency.

According to the signal supply device 50 of the fourth embodiment described above, effects similar to those of the signal supply device 50 of the first embodiment can be obtained.

E. Fifth Embodiment

Since the device configuration of the signal supply device 50 of the fifth embodiment is the same as those of the signal supply devices 50 of the first and third embodiments, the same components are designated by the same reference numerals, and detailed description thereof will be omitted. In the frequency adjustment process of the third embodiment, the frequency f(op) is increased by 0.1 kHz from the lower limit frequency f(DL) to the upper limit frequency f(UL), and when the frequency f(op) is reached the upper limit frequency f(UL), the frequency f(op) at the maximum value among the antenna current stored by that time is specified, and the specified frequency f(op) is set as the usage frequency. The usage frequency adjustment process of the fifth embodiment is the same as that of the third embodiment in that the frequency is increased by 0.1 kHz from the lower limit frequency f(DL) to the upper limit frequency f(UL). However, when an inflection point of the antenna current value occurs during the increase, the increase is stopped, and the usage frequency is set. Hereinafter, a specific description will be given with reference to FIG. 7.

Figure 7:
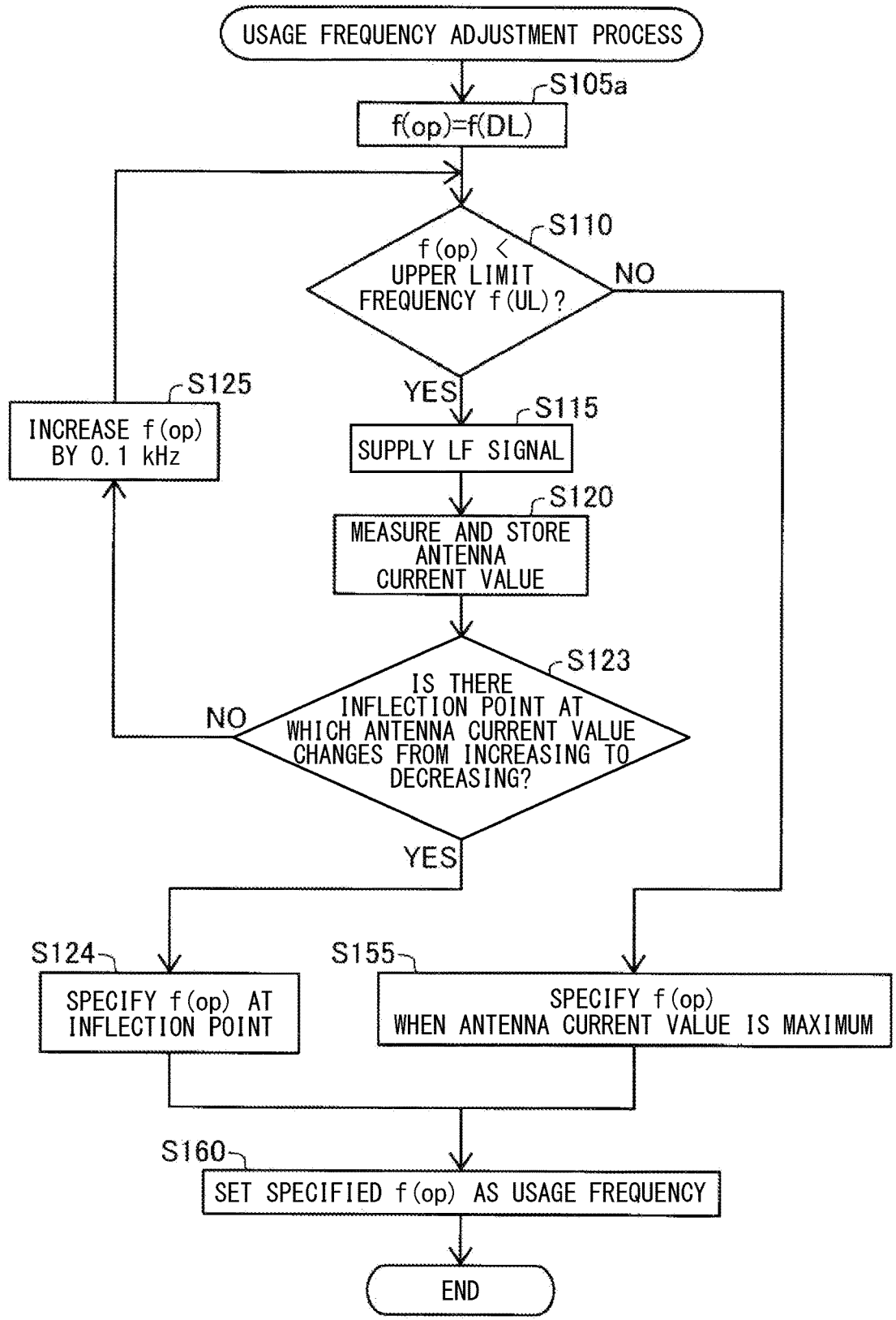
FIG. 7 is a flowchart showing a procedure of a usage frequency adjustment process in a fifth embodiment.

The usage frequency adjustment process of the fifth embodiment shown in FIG. 7 is different from the usage frequency adjustment process of the third embodiment shown in FIG. 5 in that S123 and S124 are additionally executed. Since the other procedures of the usage frequency adjustment process of the fifth embodiment are the same as those of the usage frequency adjustment process of the third embodiment, the same procedures are designated by the same reference numerals and detailed description thereof will be omitted.

After the measured antenna current value and the frequency f(op) of the carrier wave at this time are stored in the storage 26 in association with each other in S120, the controller 21 determines whether there is an inflection point at which the antenna current value changes from increasing to decreasing, with reference to the history of the antenna current value stored in the storage 26 (S123). When it is determined that there is no inflection point (S123: NO), the above-described S125 is executed, and the frequency f(op) is increased by 0.1 kHz.

On the other hand, when it is determined that there is an inflection point (S123: YES), the controller 21 specifies the frequency f(op) at the inflection point (S124). After that, S160 is executed. Therefore, when S124 is executed, the frequency f(op) at the inflection point is set as the usage frequency. The antenna current increases when the frequency f(op) of the carrier wave approaches the resonance frequency of the LF transmission antenna 30, and the antenna current decreases when the frequency f(op) of the carrier wave is away from the resonance frequency. Therefore, when there is an inflection point at which the antenna current value changes from increasing to decreasing, it can be said that the frequency at the inflection point is the frequency closest to the resonance frequency of the vehicle system 300. Therefore, in the fifth embodiment, the frequency at the inflection point is set as the usage frequency.

If the frequency f(op) of the carrier wave reaches the upper limit frequency f(UL) without an inflection point in the middle of increasing the frequency f(op) by 0.1 kHz (S110: NO), the above-described S155 and S160 are executed, and the frequency when the antenna current is the maximum is set as the usage frequency.

According to the signal supply device 50 of the fifth embodiment described above, effects similar to those of the signal supply device 50 of the first embodiment and the third embodiment are obtained. In addition, when it is determined that there is an inflection point of the antenna current in the process of increasing the frequency by 0.1 kHz from the lower limit frequency f(DL) to the upper limit frequency f(UL), the frequency at the inflection point is set as the usage frequency. Therefore, it is not necessary to transmit the test signal, measure the antenna current, and store the antenna current value in the storage 26 in the entire frequency range of the design tolerance, and the usage frequency adjustment process can be completed in a short time.

F. Other Embodiments (F1) In S155 of the usage frequency adjustment process of each embodiment, the frequency f(op) when the antenna current value is the maximum is specified, and the specified frequency f(op) is set as the usage frequency. However, the present disclosure is not limited to this. When the frequency f(op) of the carrier wave is changed within the frequency range of the design tolerance, the frequency corresponding to one of the antenna current values on the larger side among the antenna current values may be specified, and the specified frequency may be set as the usage frequency. Even in such a configuration, compared with a configuration in which the frequency corresponding to one of the antenna current values on the smaller side among the antenna current value is set as the usage frequency, the deviation between the usage frequency and the resonance frequency of the LF transmission antenna 30 can be reduced.

(F2) In S155 of the usage frequency adjustment process in each embodiment, the controller 21 specifies the frequency corresponding to the maximum antenna current value by referring to the antenna current values and the frequencies stored in the storage 26. However, the present disclosure is not limited to this. For example, each time the antenna current value is measured, the measured antenna current value may be overwritten and saved if it is larger than the antenna current value stored in the storage 26, and may not be stored in the storage 26 if it is smaller. In such a configuration, the frequency finally stored in the storage 26 may be specified in S155, and the specified frequency may be set as the usage in S160.

(F3) In the first embodiment, the order of executing S105 to S125 and S130 to S150 may be changed. Further, S123 and S124 of the fifth embodiment may be added to the fourth embodiment. Specifically, S123 may be executed after S145, and when it is determined that there is an inflection point, S124 described above may be executed, and when it is determined that there is no inflection point, S150 described above may be executed. Even in such a configuration, effects similar to those of the fourth embodiment and the fifth embodiment are obtained.

(F4) The usage frequency adjustment process of each embodiment has been executed for the antenna (LF transmission antenna 30) and the signal supply device (signal supply devices 50, 50a) for transmitting the signal in the LF band, but the present disclosure is not limited to this. The usage frequency adjustment process of each embodiment may be executed for a resonance frequency of another antenna that outputs a signal of any frequency band and another signal supply device that supplies an output target signal to the antenna. For example, the usage frequency adjustment process of each embodiment may be executed for an antenna and a signal supply device for transmitting a signal in any frequency band such as a VLF (Very Low Frequency) frequency band of 3 kHz to 30 kHz and an MF (Medium Frequency) frequency band of 300 kHz to 3 MHz.

(F5) The configuration of the signal supply device 50 or 50a in each embodiment is merely an example and can be changed in various ways. For example, in each embodiment, the CPU 10 constitutes a part of the in-vehicle device (ECU) for realizing remote keyless entry, but a CPU different from the in-vehicle device may be used. Further, in each embodiment, each function of the LF transmission control IC 20 or 20a may be realized by a plurality of ICs. Further, in the second embodiment, a part of the functions of the LF transmission control IC 20a may be realized by the CPU 10. Further, in each embodiment, the amount of change when changing the frequency f(op) of the carrier wave does not have to be constant. For example, the amount of increase in S125 and the amount of decrease in S150 may be different from each other.

(F6) The signal supply devices 50, 50a and the technique according to the present disclosure may be achieved by a dedicated computer provided by constituting a processor and a memory programmed to execute one or more functions embodied by a computer program. Alternatively, the signal supply devices 50, 50a and the technique according to the present disclosure may be achieved by a dedicated computer provided by constituting a processor with one or more dedicated hardware logic circuits. Alternatively, the signal supply devices 50, 50a and the technique according to the present disclosure may be achieved using one or more dedicated computers constituted by a combination of a processor and a memory programmed to execute one or more functions and a processor with one or more hardware logic circuits. The computer program may be stored, as instructions to be executed by a computer, in a tangible non-transitory computer-readable medium.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A signal supply device for supplying an output target signal to an antenna, comprising:
    a frequency adjuster configured to adjust a frequency of a carrier wave;
    a modulator configured to modulate the carrier wave with an input signal;
    an amplifier configured to amplify the carrier wave that is modulated to generate the output target signal and supply the output target signal to the antenna;
    a current measurer configured to measure an antenna current that flows through the antenna;
    a frequency setter configured to set a usage frequency used as the frequency of the carrier wave; and
    a controller, wherein
    while the controller executes a test signal supply process in which the controller controls the frequency adjuster to change the frequency of the carrier wave within a frequency range predetermined as a range of a resonance frequency of the antenna, controls the modulator to modulate the carrier wave with a test signal as the input signal, controls the amplifier to amplify the carrier wave that is modulated and supply the carrier wave that is amplified as the output target signal to the antenna, the controller controls the current measurer to measure the antenna current corresponding to the frequency each time the frequency of the carrier wave is changed, and
    the frequency setter sets, as the usage frequency, the frequency corresponding to the antenna current on a larger side among the antenna currents measured during execution of the test signal supply process.

2. The signal supply device according to claim 1, wherein the frequency setter sets, as the usage frequency, the frequency corresponding to a maximum value among the antenna currents measured during execution of the test signal supply process.

3. The signal supply device according to claim 1, wherein in the test signal supply process, the controller performs either one of increase or decrease of the frequency within the frequency range in order from an initial value predetermined as the usage frequency, and when the frequency reaches a critical value in the frequency range, the controller performs the other of increase or decrease in the frequency range from the initial value to another critical value in the frequency range.

4. The signal supply device according to claim 1, further comprising
    a storage configured to store a value of the antenna current measured for each frequency of the carrier wave in the test signal supply process, wherein
    the frequency setter sets the usage frequency by referring to the values of the antenna currents stored in the storage in the test signal supply process.

5. The signal supply device according to claim 1, wherein the frequency of the carrier wave is a frequency in a low frequency band.

6. A signal supply device comprising a processor and a memory, the memory storing instructions configured to, when executed by the processor, cause the processor to:
    execute a test signal supply process in which the processor changes a frequency of a carrier wave within a frequency range predetermined as a range of a resonance frequency of an antenna, modulates the carrier wave with a test signal as an input signal, amplifies the carrier wave that is modulated, and supplies the carrier wave that is amplified as an output target signal to the antenna;
    measure an antenna current corresponding to the frequency each time the frequency of the carrier wave is changed while executing the test signal supply process, the antenna current being an electric current that flows through the antenna; and
    set, as a usage frequency used as the frequency of the carrier wave, the frequency corresponding to the antenna current on a larger side among the antenna currents measured during execution of the test signal supply process.

* * * * *